United States Patent Office 3,305,522
Patented Feb. 21, 1967

3,305,522
RUBBER ANTIOXIDANT
Ronald B. Spacht, Kent, Ohio, assignor to The Goodyear Tire & Rubber Company, Akron, Ohio, a corporation of Ohio
No Drawing. Filed June 21, 1963, Ser. No. 289,755
10 Claims. (Cl. 260—45.95)

This invention relates to antioxidants for oxidizable organic materials, their preparation and their use in the stabilization of organic materials such as rubber, gasoline, oils, etc. which normally tend to deteriorate in sunlight and air. More particularly the invention relates to antioxidants which are reaction products formed by reacting dicyclopentadiene with a phenolic compound and further reacting said reaction product with a tertiary olefin.

The stabilization of rubber compositions with a reaction product of dicyclopentadiene and a phenolic compound has been described in United States Patent No. 3,036,138 of May 22, 1962. This patent discloses that reaction products prepared by reacting dicyclopentadiene with phenolic materials having at least one of the 2, 4 and 6 positions substituted by a hydrogen atom are effective stabilizers for rubber. However, neither this patent nor any of the previously known technical literature disclose the unexpected effectiveness of the antioxidants of the present invention.

In accordance with the present invention rubber compositions are effectively stabilized in incorporating therein a small amount of a specific class of compounds prepared by a two-step process which involves reacting one mol of dicyclopentadiene with at least one mol of a phenolic compound selected from the group consisting of phenol, para-cresol, mixed meta-para-cresol and para-ethyl phenol in the presence of a Friedel-Craft type catalyst. More specifically, the phenolic materials that are effectively reacted with dicyclopentadiene in accordance with the first step of the present proces may be defined as phenolic compounds conforming to the following structure

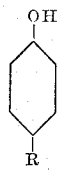

wherein R is a radical selected from the group consisting of hydrogen, methyl and ethyl. Preferred proportions of reactants in the resulting product are from 1.50 to 1.75 mols of phenolic compound per mol of dicyclopentadiene. This reaction product of dicyclopentadiene and phenolic compound is subsequently alkylated with at least one-half mol of a tertiary olefinic material per mol of dicyclopentadiene, said tertiary olefinic material being selected from the group consisting of isobutylene, tertiary hexenes and tertiary pentenes.

The amount of olefinic material to be employed will depend upon the phenolic compound used and also upon the molar ratio of phenolic compound and dicyclopentadiene in the reaction product. Thus the product prepared from phenol and dicyclopentadiene will react with more of the olefinic compound than the product from para-cresol also a reaction product of phenol containing a 2:1 molar ratio of phenol and dicyclopentadiene will react with more olefin that a 1:1 product. While products that are incompletely alkylated possess superior antioxidant properties compared to unalkylated products, preferred products are those in which alkylation is substantially complete. Preferred proportions of reactants in the final alkylation product are from 1.0 to 2.0 mols of tertiary olefinic material per mol of dicyclopentadiene when para-cresol, mixtures of meta-para-cresol and para-ethyl phenol are reacted with dicyclopentadiene to produce the product of step one. The preferred proportions of reactants in the final alkylation product are from 2.0 to 4.0 mols of tertiary olefinic material per mol of dicyclopentadiene when phenol is reacted with dicyclopentadiene to produce the product of step one. A slight excess of the alkylating agent is generally employed to assure that the desired amount reacts with the product from stage one. The reaction products prepared in accordance with the above described procedure have been found to be much more effective as rubber antioxidants than the one-step reaction products prepared by reacting dicyclopentadiene with phenolic materials the nucleus of which is already substituted with tertiary hydrocarbon groups.

The reaction between dicyclopentadiene and the phenolic compounds is effectively catalyzed by a Friedel-Craft type catalyst, and in particular the more potent Friedel-Craft catalysts such as aluminum chloride, zinc chloride, ferrous and ferric chloride and boron trifluoride, as well as complexes based on boron trifluoride. Boron trifluoride and complexes based on boron trifluoride are preferred catalysts for the first step of the disclosed process. The second step of the above described two-step reaction process, wherein the product obtained by reacting dicyclopentadiene and a phenolic compound is further alkylated with a tertiary olefin, is effectively catalyzed by employing one or more of the customary acidic alkylation catalysts such as sulfuric acid, benzene sulfonic acid, toluene sulfonic acid, acid activated clays, boron trifluoride, zinc chloride, ferrous and ferric halides, aluminum halides and the stannous and stannic halides. Sulfuric acid, benzene sulfonic acid, toluene sulfonic acid and acid activated clay are preferred catalysts for the second step of the disclosed process. The catalysts employed in both the first and second stages of the disclosed process are employed in the customary catalytic amounts, which will normally vary from 0.1 percent to 5.0 percent of catalyst based on the total weight of the reactants in the reaction which is to be catalyzed.

While boron trifluoride will function as an alkylation catalyst to catalyze the second step of the disclosed process it is not a particularly desirable alkylation catalyst since it tends to promote undesirable side reactions. It is therefore prefered to remove the boron trifluoride catalyst when it is employed in the first step of the reaction before proceding with the second or alkylation step of the disclosed process. The boron trifluoride catalyst may be effectively removed by destroying it with a basic material such as ammonia, or a solution of sodium hydroxide or sodium carbonate. Alternatively the boron trifluoride catalyst may be removed along with excess phenolic materials by heating the reaction mixture to a temperature from 100 to 160° C. under vacuum. An additional method of removing the boron trifluoride catalyst employed in the first step of the disclosed process is by refluxing the reaction mixture from step one with a small quantity of an inert organic solvent such as toluene at a temperature between 150 and 160° C. In either of the latter two methods the boron trifluoride may be recovered and subsequently reused in catalyzing the reaction of step one. The acidic alkylation catalyst employed to catalyze the second step of the disclosed process is normally neutralized with a suitable basic material such as a sodium carbonate solution.

The reaction defined as step one of the disclosed two-step process wherein dicyclopentadiene is reacted with a phenolic compound is conducted at a temperature from 25 to 160° C. Preferred reaction temperatures are between 80 and 150° C. The reaction between dicyclopentadiene and a phenolic compound may be started at room temperature and since the reaction is quite rapid and exothermic the heat of reaction may be used to obtain the final reaction temperature. If adequate cooling facilities are available the reaction may be carried out on a continuous basis.

The molar ratio of phenolic compound to dicyclopentadiene employed in the reaction mixture of stage one of the disclosed process can be varied from 1:1 or 5 or more :1 mols of phenolic compound per mole of dicyclopentadiene. The proportions usually employed range from 2:1 to 4:1 mols of phenolic compounds per mol of dicyclopentadiene, a preferred ratio being 3:1. The above preferred proportions of reactants provide for a substantial excess of the phenolic compounds beyond that which will actually react with the dicyclopentadiene. The molar proportions of phenolic compound which reacts with dicyclopentadiene usually varies from 1:1 to 2:1 with the preferred molar ratio of reactants in the product obtained from step one of the disclosed process ranging from 1.50 to 1.75 mols of phenolic compound per mol of dicyclopentadiene. In some instances it may be desirable to carry out stage one of the disclosed process in an inert organic solvent such as benzene, toluene, etc. The employment of a solvent is particularly desirable if a relatively low ratio of phenolic compound to dicyclopentadiene is used. When the molar ratio of phenolic compound to dicyclopentadiene is 3 or more :1 the excess phenolic compound acts as an effective solvent and no additional solvent need be employed.

Step one of the present process may be carried out by adding the dicyclopentadiene to the mixture of phenolic compound and catalyst or the catalyst may be added gradually to the mixture of phenolic compound and dicyclopentadiene, the first of these two procedures is preferred. The rate at which the reactants are combined can vary over a wide range as long as the temperature is kept below 160° C.

The second step of the disclosed process involves alkylation of the product obtained in step one. In carrying out the second step of the process the resinous product obtained from step one is dissolved in an equal quantity of an inert hydrocarbon solvent such as benzene, toluene, etc. Alkylation is conducted at a temperature between 20 and 100° C. A preferred temperature range is between 60 and 80° C. If the tertiary olefin which is employed as an alkylation agent is a gas it may be added to the reaction under pressure but the pressures should not exceed 30 p.s.i. if excessive polymerization is to be avoided. In step two of the process it is also preferable to carry out the alkylation as rapidly as possible, however the time within which the reaction is completed is dependend upon the activity of the alkylating agent used.

The observed antioxidant effectiveness of the complex reaction products prepared in accordance with the present invention is exactly opposite from what would normally have been expected by one skilled in the art of rubber chemicals, because a complex reaction product prepared from a phenolic material having a $C_4$ to $C_{10}$ hydrocarbon substcituent attached in the 2 and/or 6 positions would logically be expected to produce a phenolic derivative having the maximum amount of steric hindrance.

The chemical compositon of the very complex reaction mixture consisting of rather high molecular weight molecules which is obtained by practicing the teachings of the present invention is incapable of being assigned an exact chemical formula. Furthermore, no pure compounds have been isolated from the reaction product. The applicant is therefore unable to assign a precise chemical formula to the resulting reaction mixtures or to define them in terms of standard chemical nomenclature.

The antioxidants of the present invention are useful in stabilizing rubber in the latex form, coagulated rubber latices or vulcanized rubber. They are employed in normal antioxidant amounts which may range from 0.25 to 8.0 parts by weight based on the weight of rubber, although it is generally preferred to use from 0.5 to 2.0 parts of the antioxidant per 100 parts of rubber. The following examples are illustrative of the preparation of the antioxidant compositions of the present invention but are not intended as limitations on the scope of the invention.

*Example 1*

Three hundred and thirty grams of para-cresol and 9.0 grams of a phenol $BF_3$ complex containing 26 percent $BF_3$ were heated to 100° C. and then 132 grams of dicyclopentadiene were added over a period of three and one-half hours. The excess para-cresol was removed by heating to a column temperature of 150° C. at 4 mm., this procedure also removed the $BF_3$ catalyst. A residue of 316 grams was obtained.

Two hundred and thirty-six grams of this product were dissolved in an equal weight of toluene and 4.0 grams of $H_2SO_4$ added. The solution was heated to 80° C. and 168 grams of isobutene added over a period of one and three-fourths hours. The mixture was heated one hour longer then the catalyst was destroyed with a $Na_2CO_3$ solution. Volatiles and unreacted materials were removed by heating to 175° C. at 30 mm. Catalyst residues were removed by filtration. Weight of the product was 313 grams.

*Example 2*

Three hundred and seventy-six grams of phenol and 9 grams of a phenol $BF_3$ complex containing 26 percent $BF_3$ were heated to 90° C. One hundred and thirty-two grams of dicyclopentadiene were then added in one hour between 90 and 107° C. The mixture was held at this temperature several hours longer. Then heated to 180° C. at 15 mm. to remove the $BF_3$ and the unreacted phenol. A yield of 291 grams of a hard resin was obtained. The ratio of phenol to dicyclopentadiene was 1.69 to 1.

*Example 3*

A 215 gram portion of the product from Example 2 was dissolved in 400 mls. of toluene. Six grams of concentrated $H_2SO_4$ were added. The mixture was heated to 55° C. and isobutylene added in three and one-half hours or until no more was absorbed. The catalyst was destroyed with 12 grams of $Na_2CO_3$ dissolved in 50 mls. of $H_2O$. The volatiles were removed by heating to 150° C. at atmospheric pressure and then flashing off the remainder at the same temperature at 15 mm. Three hundred and nine grams of product were obtained.

*Example 4*

One hundred and seventy-four grams of a reaction product of para-cresol and dicyclopentadiene prepared according to Example 1 were dissolved in 200 mls. of toluene and 6 grams of concentrated $H_2SO_4$ were then added to the solution. The solution was heated to 76° C. and 100 grams of 2-methyl-1-pentene added in one hour. The mixture was held between 60 and 70° C. for six hours longer. The catalyst was destroyed with 40 grams of 25 percent Na₂CO₃ solution. The mixture was then heated to a final pot temperature of 150° C. at 15 mm. to remove volatiles. Two hundred and thirty-five grams of product were obtained.

*Example 5*

Four hundred and one grams of para-ethyl phenol and 10 grams of a phenol BF₃ complex containing 26 percent BF₃ were heated to 84° C. and then 132 grams of dicyclopentadiene were added in two and one-half hours time. The mixture was then heated to 190° C. (pot temperature) at 10 mm. to remove the BF₃ and the excess para-ethyl phenol. Yield of product was 331 grams. The molar ratio of para-ethyl phenol to dicyclopentadiene was 1.63 to 1.

*Example 6*

Two hundred and thirty-seven grams of the product from Example 5 were dissolved in 250 mls. of toluene and 10 grams of concentrated H₂SO₄ were added to the solution. The mixture was heated to 65° C. and isobutylene added until no more would react, this took approximately three hours. Fifty grams of a 25 percent Na₂CO₃ solution were then added to destroy the catalyst and the whole mixture heated to 180° C. at 10 mm. to remove volatiles. Weight of the product was 301 grams.

*Example 7*

Three hundred and twenty-four grams of a mixed meta-para-cresol having a 3° boiling point range and 9 grams of a phenol BF₃ complex were heated to 80° C. and then 132 grams of dicyclopentadiene were added in two hours. The mixture was maintained at 80° C. and stirred one hour longer. The excess meta-para-cresol and the BF₃ were then removed by heating to a pot temperature of 190° C. at 10 mm. Weight of the product was 294 grams. This represents a 1.5 to 1 molar ratio of meta-para-cresol to dicyclopentadiene.

*Example 8*

Two hundred and six grams of the reaction product from Example 7 were dissolved in 250 mls. of toluene and 10 grams of concentrated H₂SO₄ added to the solution. The mixture was heated to 63° C. and 150 grams of 2-methyl-1-butene were added in two hours. The mixture was held at 60° C. for four more hours. The catalyst was then destroyed and the volatiles removed as in previous examples. Yield of the product was 263 grams.

In contrast to the compounds prepared in accordance with preceding Examples 1, 3, 4, 6 and 8, related reaction products prepared by a one-step reaction from dicyclopentadiene and phenolic compounds having hydrocarbon substituents were prepared for comparative purposes in accordance with the procedure outlined in the following examples.

*Example 9*

Two hundred and fifty grams of 6-tertiary butyl-meta-cresol and 5.0 grams of a phenol BF₃ complex were warmed to 80° C. Then 66 grams of dicyclopentadiene were added in one hour. The mixture was heated at 80° C. for one hour longer. The unreacted materials and catalyst were removed by heating to 180° C. (pot temperature) at 10 mm. Weight of the product was 173 grams.

*Example 10*

Five hundred grams of 6-tertiary butyl-ortho-cresol and 9.0 grams of a para-cresol BF₃ complex (26 percent BF₃) were mixed and then 66 grams of dicyclopentadiene added between 25 and 35° C. in seven hours. The catalyst was destroyed with a Na₂CO₃ solution and the mixture then heated to 190° C. at 8 mm. to remove volatiles and unreacted 6-tertiary butyl-ortho-cresol. Weight of the product was 307 grams.

*Example 11*

Two hundred grams of 2,4-ditertiary butyl phenol and 6 grams of a para-cresol BF₃ complex were heated to 80° C. and then 66 grams of dicyclopentadiene added in two hours. Reacted two hours longer then added a Na₂CO₃ solution to kill the catalyst and heated to 190° C. at 8 mm. to remove volatiles and unreacted materials. Weight of the product was 196 grams.

*Example 12*

Two hundred grams of 2,4-dimethyl phenol and 5.0 grams of a phenol BF₃ complex were heated to 77° C. Seventy-three grams of dicyclopentadiene were then added in one hour. The mixture was held at 80° C. for two more hours, then heated to 190° C. at 10 mm. to remove catalyst and excess 2,4-dimethyl phenol. Weight of the product was 191 grams.

*Example 13*

Five hundred grams of 6-tertiary butyl-para-cresol were mixed with 10 grams of a para-cresol BF₃ complex and heated to 68° C. One hundred and thirty-two grams of dicyclopentadiene were then added in one and one-half hours. The mixture was held at 80° C. for another hour. Volatiles and unreacted materials were removed by heating to 175° C. at 1 mm. Weight of product was 403 grams. Molar ratio of 6-tertiary butyl-para-cresol to dicyclopentadiene was 1.65 to 1.

*Example 14*

Three hundred and seventy-two grams of para-methoxy phenol and 9.0 grams of a phenol BF₃ complex containing 26 percent BF₃ were heated to 85° C., 132 grams of dicyclopentadiene were added in three hours and the reactants then permitted to react one hour longer. The catalyst was destroyed with a Na₂CO₃ solution. The reaction mixture was then heated to 190° C. at 10 mm. to remove unreacted materials. Weight of product was 319 grams. Molar ratio of para-methoxy phenol to dicyclopentadiene was 1.51 to 1.

*Example 15*

Two hundred and thirty-five grams of the reaction product of Example 14 were dissolved in 400 mls. of toluene and 6.0 grams of concentrated H₂SO₄ were added. The reaction mixture was then heated to 64° C. and isobutylene added slowly over several hours. The catalyst was destroyed with a No₂CO₃ solution and the reaction mixture heated to 150° C. at 10 mm. to remove volatiles. Weight of the product was 291 grams.

*Example 16*

Four hundred and five grams of para-cresol and 13.0 grams of a phenol BF₃ complex containing 26 percent BF₃ were mixed at room temperature. One hundred and thirty-two grams of dicyclopentadiene were then added in five minutes time. The temperature rose to 155° C. and then fell rapidly, the reactants were stirred for one-half hour longer and then heated to 190° C. at 10 mm. to remove the catalyst and the excess para-cresol. Three hundred and eight grams of reaction product were obtained. This represents a molar ratio of para-cresol to dicyclopentadiene of 1.63 to 1. This product is then alkylated in the usual manner in accordance with the procedure described in the foregoing examples.

The effectiveness of the antioxidant compositions prepared in accordance with the present invention and in contrast to related compositions disclosed in the prior art was evaluated by conducting oxygen absorption tests at 70° C. on samples of SBR 1006, a hot processed polymer containing approximately 25 parts styrene and 75 parts of butadiene. One part of the indicated antioxidant composition per 100 parts of rubber was incorporated in the various rubber samples.

TABLE I.—EFFECTS OF ALKYLATION ON REACTION PRODUCTS OF PHENOLS AND DICYCLOPENTADIENE

| Sample | Product | Hrs. at 1% O₂ at 70° C. |
|---|---|---|
| 1 | R.P.,* Phenol and Dicyclopentadiene | 54 |
|   | Butylated above R.P. | 205 |
| 2 | R.P., P-cresol and Dicyclopentadiene | 120 |
|   | Butylated above R.P. | 396 |
|   | Hexylated above R.P. | 326 |
| 3 | R.P., m-p-cresol and Dicyclopentadiene | 115 |
|   | Amylated above R.P. | 196 |
| 4 | R.P., p-ethyl Phenol and Dicyclopentadiene. | 104 |
|   | Butylated above R.P. | 206 |
| 5 | R.P., o-Cresol and Dicyclopentadiene | 96 |
|   | Butylated above R.P. | 96 |
| 6 | R.P., Dodecyl Phenol and Dicyclopentadiene. | 31 |
|   | Butylated above R.P. | 31 |
| 7 | R.P., p-Methoxy Phenol and Dicyclopentadiene. | 52 |
|   | Butylated above R.P. | 21 |
| 8 | R.P., m-Cresol and Dicyclopentadiene | 39 |
|   | Butylated above R.P. | 44 |
| 9 | R.P., m-Isopropyl Phenol and Dicyclopentaiene. | 34 |
|   | Butylated above R.P. | 36 |

*R.P. means reaction product.

The antioxidant effectiveness of typical reaction products prepared in accordance with the present invention was compared to the antioxidant effectiveness of related products prepared from phenolic compounds having substituents other than those of the present invention. These tests were conducted in a natural rubber gum vulcanizate which was aged for 72 hours in an oxygen bomb at 70° C. and 300 p.s.i. The natural gum vulcanizates used in this series of tests were prepared in accordance with the following formulation wherein all proportions are expressed as parts by weight per 100 parts by weight of rubber.

Extracted pale crepe _____ 100.00
Zinc oxide _____ 5.00
Sulfur _____ 3.00
Hexamethylenetetramine _____ 1.00
Stearic acid _____ 1.50
Antioxidant _____ 1.00

The results of these tests are shown in Table II below.

The data in Table II below demonstrates dramatically the very substantial improvement in antioxidant effectiveness which is obtained by alkylating certain reaction products of dicyclopentadiene and phenolic compounds in

TABLE II.—OXYGEN BOMB AGING IN NATURAL RUBBER

| Sample | Product | Percent TR** | Percent Wt. Increase |
|---|---|---|---|
| 1 | R.P.,* Phenol and Dicyclopentadiene | 0 | Melted |
|   | Butylated above R.P. | 71 | 0.73 |
| 2 | R.P., p-Cresol and Dicyclopentadiene | 28 | 3.00 |
|   | Butylated above R.P. | 74 | 0.37 |
| 3 | R.P., m,p-Cresol and Dicyclopentadiene | 21 | 2.89 |
|   | Butylated above R.P. | 53 | 0.78 |
| 4 | R.P., m-Isopropyl Phenol and Dicyclopentadiene. | 11 | 6.24 |
|   | Butylated above R.P. | 11 | 4.28 |

*R.P. means reaction product.
**TR means tensile retention.

The data presented in the above table show that alkylation of the reaction products prepared by reacting dicyclopentadiene and specific phenolic compounds results in a very substantial and unexpected degree of improvement in antioxidant effectiveness (Samples 1–4). In contrast, the alkylation of the reaction products prepared by reacting dicyclopentadiene and other phenolic compounds results in little if any improvement in antioxidant effectiveness (Samples 5–9).

The relative ineffectivness as rubber antioxidants of compositions prepared by reacting dicyclopentadiene with dialkyl phenols is demonstrated by the data presented in the following Table IA wherein reaction products prepared from various dialkylated phenolic compounds were evaluated in an oxygen absorption test as described above in connection with the materials evaluated in Table I.

accordance with the present invention (Samples 1–3 in the above table) and the striking absence of any significant improvement in antioxidant effectiveness that is obtained when a reaction product which is outside the present invention is alkylated (Sample 4 in the above table).

The completely unexpected improvement which is obtained by alkylating a reaction product of dicyclopentadiene and specific phenolic materials with a tertiary olefin in contrast to the antioxidant effectiveness of related compounds prepared by reacting dicyclopentadiene with a tertiary alkylated phenol is demonstrated by the data presented in the following table wherein all samples were evaluated in SBR 1006 polymer of the type described above in connection with the evaluations of Table I. The following samples were all subjected to an oxygen absorption test at 70° C.

TABLE IA.—OXYGEN ABSORPTION OF REACTION PRODUCTS OF DIALKYL PHENOLS AND DICYCLOPENTADIENES

Product:                     Hrs. to 1% O₂ at 70° C.
    R.P.¹ 2,6-diisopropylphenol and dicyclopentadiene _____ 76
    R.P. 2,6-dimethyl phenol and dicyclopentadiene _____ 76
    R.P. 2,4-dimethyl phenol and dicyclopentadiene _ 96
    R.P. 2,4-ditertiary butyl phenol and dicyclopentadiene _____ 21
    R.P. 2,6-ditertiary butyl phenol and dicyclopentadiene _____ 24

¹ R.P. means reaction product.

TABLE III.—EFFECTS OF PROCESS CHANGES ON ANTIOXIDANT ACTIVITY

| Sample | Product | Hrs. to 1% O₂ at 70° C. |
|---|---|---|
| 1 | R.P., 6-tert.-butyl-p-cresol and dicyclopentadiene. | 90 |
| 2 | Butylated R.P. of p-cresol and dicyclopentadiene. | 178 |
| 3 | R.P., 6-tert.-butyl-o-cresol and dicyclopentadiene. | 20 |
| 4 | R.P., 4-tert.-butyl-phenol and dicyclopentadiene. | 37 |
| 5 | R.P., 2,4-ditert. butyl-phenol and dicyclopentadiene. | 21 |
| 6 | R.P., 2,6-ditertiary butyl-phenol and dicyclopentadiene. | 24 |
| 7 | Butylated R.P. of phenol and dicyclopentadiene. | 205 |

The rubbers which may be conveniently protected by the reaction products prepared in accordance with this invention are the oxidizable rubbery polymers such as natural rubber and those synthetic oxidizable rubbery polymers of conjugated dienes which are normally susceptible to deterioration by sunlight and atmospheric oxygen. By the term "oxidizable rubbery polymers" as employed in this application is meant natural rubber and the synthetic rubbery polymers and copolymers. Representative examples of synthetic oxidizable rubbery polymers which are normally susceptible to deterioration by sunlight and atmospheric oxygen include polychloroprene; polyisoprene having essentially all of its units combined in a cis-1,4 structure; polybutadiene having essentially all of its units combined in a cis-1,4 structure; the rubbery copolymers of butadiene and styrene which may contain from 50 to 90 percent or more of butadiene; and butyl rubber which is a polymerization product of a major proportion of a mono olefin and a minor proportion of a multi olefin such as butadiene or isoprene, and the completely saturated polymers including the polyolefins such as polyethylene, polypropylene and ethylenepropylene copolymers; and the polyether rubbers such as those obtained from propylene oxide.

Having provided a complete description of the invention in such manner as to distinguish it from other inventions and from what is old, and having provided a description of the best mode contemplated of carrying out the invention, the scope of patent protection to be granted the invention is defined by the following claims.

What I claim is:

1. As oxidizable polymer selected from the group consisting of polychloroprene, polyisoprene, polybutadiene, copolymers of butadiene and styrene, polypropylene oxide, butyl rubbers, polyethylene, polypropylene and ethylene-propylene copolymers containing an antioxidant amount of a reaction product formed by (1) reacting at a temperature of from 25 to 160° C. in the presence of a Friedel-Craft type catalyst, one mol of dicyclopentadiene and at least one mol of a phenolic material selected from the group consisting of phenol, para-cresol, mixed meta-para-cresol and para-ethyl phenol and (2) further reacting the first reaction product in the presence of an acidic alkylation catalyst with at least one-half mol of an olefin selected from the group consisting of isobutylene, tertiary amylenes and tertiary hexylenes.

2. An oxidizable polymer selected from the group consisting of polychloroprene, polyisoprene, polybutadiene, copolymers of butadiene and styrene, polypropylene oxide, butyl rubbers, polyethylene, polypropylene and ethylene-propylene copolymers containing from 0.25 to 8.0 parts by weight per 100 parts by weight of rubber of a reaction product formed by (1) reacting at a temperature of from 25 to 160° C. in the presence of a Friedel-Craft type catalyst one mol of dicyclopentadiene and at least one mol of para-cresol and (2) further reacting the first reaction product in the presence of an acidic alkylation catalyst with at least one-half mol of isobutylene.

3. An oxidizable polymer selected from the group consisting of polychloroprene, polyisoprene, polybutadiene, copolymers of butadiene and styrene, polypropylene oxide, butyl rubbers, polyethylene, polypropylene and ethylene-propylene copolymers containing from 0.25 to 8.0 parts by weight per 100 parts by weight of rubber of a reaction product formed by reacting at a temperature of from 25 to 160° C. in the presence of a Friedel-Craft type catalyst (1) one mol of dicyclopentadiene and at least one mole of phenol and (2) further reacting the first reaction product in the presence of an acidic alkylation catalyst with at least one-half mol of a tertiary amylene.

4. An oxidizable polymer selected from the group consisting of polychloroprene, polyisoprene, polybutadiene, copolymers of butadiene and styrene, polypropylene oxide, butyl rubbers, polyethylene, polypropylene and ethylene-propylene copolymers containing an antioxidant amount of an alkylated reaction product of a reaction product formed by reacting at a temperature of from 25 to 160° C. dicyclopentadiene with a phenolic compound selected from the group consisting of phenol, para-cresol, mixed meta-para-cresol and para-ethyl phenol and wherein the alkylation reaction is accomplished by employing as an alkylating agent a tertiary olefin selected from the group consisting of isobutylene, tertiary amylene and tertiary hexylene.

5. An oxidizable polymer selected from the group consisting of polychloroprene, polyisoprene, polybutadiene, copolymers of butadiene and styrene, polypropylene oxide, butyl rubbers, polyethylene, polypropylene and ethylene-propylene copolymers containing from 0.25 to 8.0 parts by weight per 100 parts by weight of rubber of an alkylated reaction product of a reaction product formed by reacting at a temperature of from 25 to 160° C. dicyclopentadiene with a phenolic compound selected from the group consisting of phenol, para-cresol, mixed meta-para-cresol and para-ethyl phenol and wherein the alkylation reaction is accomplished by employing as an alkylating agent a tertiary olefin selected from the group consisting of isobutylene, tertiary amylene and tertiary hexylene.

6. An oxidizable polymer selected from the group consisting of polychloroprene, polyisoprene, polybutadiene, copolymers of butadiene and styrene, polypropylene oxide, butyl rubbers, polyethylene, polypropylene and ethylene-propylene copolymers containing an antioxidant amount of a reaction product formed by (1) reacting at a temperature of from 25 to 160° C. in the presence of a boron trifluoride catalyst one mol of dicyclopentadiene and at least one mole of a phenolic material selected from the group consisting of phenol, para-cresol, mixed meta-para-cresol and para-ethyl phenol, (2) removing the boron trifluoride catalyst from the reaction product and (3) further reacting the first reaction product in the presence of an acidic alkylation catalyst with at least one-half mol of an olefin selected from the group consisting of isobutylene, tertiary amylene and tertiary hexylene.

7. An oxidizable polymer selected from the group consisting of polychloroproprene, polyisoprene, polybutadiene, copolymers of butadiene and styrene, polypropylene oxide, butyl rubbers, polyethylene, polypropylene and ethylene-propylene copolymers containing an antioxidant amount of a reaction product formed by (1) reacting at a temperature of from 25 to 160° C. in the presence of a boron trifluoride catalyst, one mol of dicyclopentadiene and at least one mol of a phenolic material selected from the group consisting of phenol, para-cresol, mixed meta-para-cresol and para-ethyl phenol, (2) removing the boron trifluoride catalyst from the reaction product and (3) alkylating the first reaction product in the presence of sulfuric acid with at least one-half mol of isobutylene.

8. The reaction product formed by (1) reacting at a temperature of from 25 to 160° C. in the presence of a Friedel-Craft type catalyst one mol of dicyclopentadiene and at least one mol of a phenolic material selected from the group consisting of phenol, para-cresol, mixed meta-para-cresol and para-ethyl phenol and (2) further reacting the first reaction product in the presence of an acidic alkylation catalyst with at least one-half mol of an olefin selected from the group consisting of isobutylene, tertiary amylenes and tertiary hexylenes.

9. The reaction product formed by (1) reacting at a temperature of from 25 to 160° C. in the presence of a Friedel-Craft type catalyst one mol of dicyclopentadiene and at least one mol of para-cresol and (2) further reacting the first reaction product in the presence of an acidic alkylation catalyst with at least one-half mol of isobutylene.

10. The reaction product formed by (1) reacting at a temperature of from 25 to 160° C. in the presence of a boron trifluoride catalyst one mole of dicyclopentadiene and at least one mol of a phenolic material selected from the group consisting of phenol, para-cresol, mixed meta-para-cresol and para-ethyl phenol, (2) removing the boron trifluoride catalyst from the reaction product and (3) further reacting the first reaction product in the presence of an acidic alkylation catalyst with at least one-half mol of an olefin selected from the group consisting of isobutylene, tertiary amylene and tertiary hexylene.

References Cited by the Examiner

UNITED STATES PATENTS

| | | | |
|---|---|---|---|
| 2,567,848 | 8/1951 | Kooyman | 260—619 |
| 2,864,868 | 12/1958 | Bader | 260—619 |
| 2,874,193 | 2/1959 | Dijkstra | 260—619 |
| 3,036,138 | 5/1962 | Mingasson | 260—45.95 |

LEON J. BERCOVITZ, *Primary Examiner.*

H. E. TAYLOR, *Assistant Examiner.*